April 28, 1964  J. H. ANDERSEN  3,130,998
RUBBER BUMPER FOR AUTOMOBILES
Filed Nov. 13, 1962
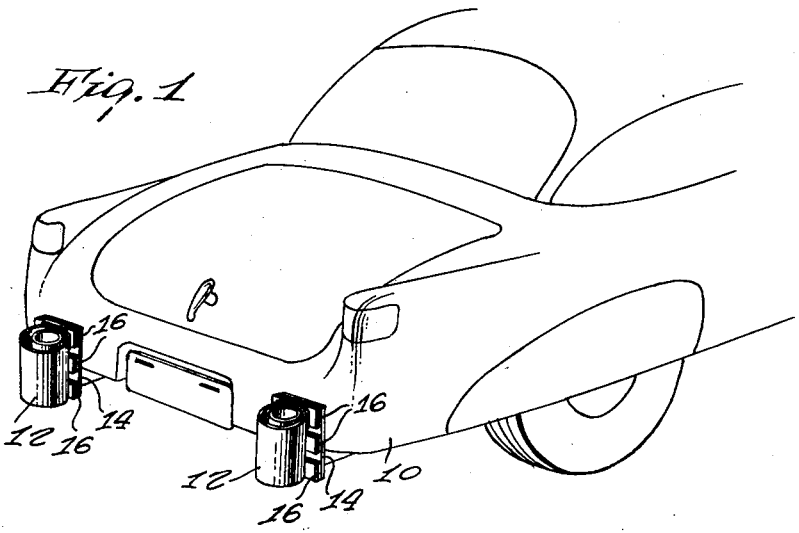
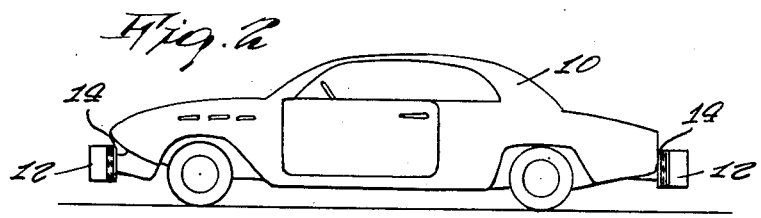
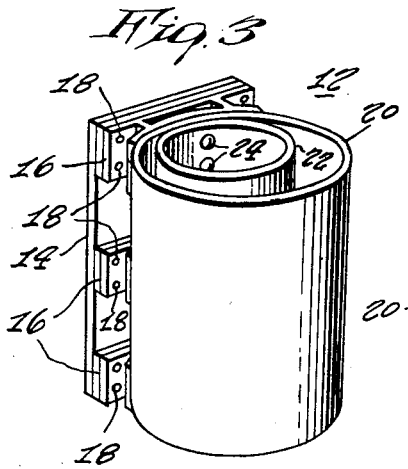 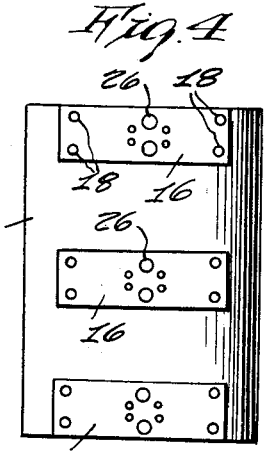 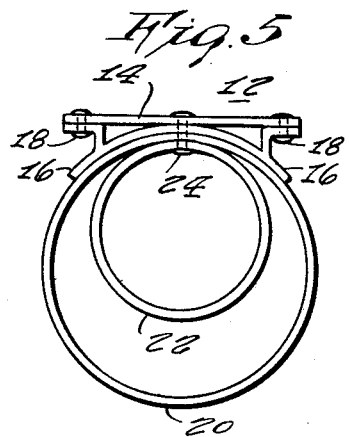
INVENTOR.
JOHANNES H. ANDERSEN
BY
Carl Miller
ATTORNEY

United States Patent Office 3,130,998
Patented Apr. 28, 1964

3,130,998
RUBBER BUMPER FOR AUTOMOBILES
Johannes H. Andersen, 31 Clairmont Ave.,
Westwood, N.J.
Filed Nov. 13, 1962, Ser. No. 237,084
5 Claims. (Cl. 293—64)

My invention relates to bumpers for automobiles, and more particularly relates to automobile bumpers that are flexible.

This application is a continuation-in-part of my co-pending application S.N. 156,579, filed December 4, 1961, on invention for rubber bumper for automobiles, now abandoned.

It is an object of my invention to provide an automobile bumper which is flexible rather than rigid, and consequently will absorb energy upon impact, thus protecting the automobile and its passengers during a collision or other cause of such impact.

Another object of my invention is to provide a flexible bumper for automobiles which is inexpensive to construct, install or replace.

Yet another object of my invention is to provide flexible bumpers for automobiles which are formed from rubber and which are adapted for attachment to the front and/or rear of the automobile.

All of the foregoing and still further objects and advantages of my invention will either be explained, or will become apparent when this specification is studied in conjunction with the accompanying drawings, wherein:

FIGURE 1 is a perspective view of the rear of an automobile incorporating my invention;

FIGURE 2 is a side view of an automobile incorporating my invention;

FIGURE 3 is a perspective view of my invention;

FIGURE 4 is a rear view of my invention, with the rear plate removed therefrom; and FIGURE 5 is a top plan view of my invention.

Referring now to the drawings, an automobile 10 has rubber bumpers 12, two of which are secured in spaced positions at the rear of the automobile, while an additional two are secured in spaced positions to the front of the automobile. (While in FIGURES 1 and 2, the conventional metal bumpers have been removed from the automobile, and bumpers 12 have been secured directly to the frame, the metal bumpers can be retained and rubber bumpers 12 can be secured to these metal bumpers.)

Each bumper 12 comprises a flat vertical metal plate 14, carrying three equidistantly spaced curved metal cradles 16 which extend horizontally and which are riveted or welded to plate 14 at 18.

A first hollow rubber cylinder 20, open at both ends, and having its axis vertical, is placed in contact with cradles 16. A second vertical hollow rubber cylinder 22 having a smaller diameter than cylinder 20, is placed within cylinder 20, whereby cylinders 20 and 22 make contact at a vertical line of tangency coincident with the vertical center line of the three cradles 16. Rivets 24 or other conventional securing means extend through this line of tangency, through holes 26 in each cradle coincident with the vertical line, and through corresponding holes in plate 14 to secure the cylinders to the cradles and plate.

While I have shown and described and pointed out my invention as applied to the embodiments disclosed above, many modifications will be apparent to those skilled in the art. Hence my protection is to be limited only by the terms of the claims which follow.

Having thus described my invention, I claim as new, and desire to secure by Letters Patent:

1. An automobile bumper comprising a first vertical hollow cylinder open at both ends, and a second vertical hollow cylinder open at both ends and of smaller diameter than said first cylinder, said second cylinder being placed within said first cylinder, non-concentrically in such manner that said cylinders touch each other along a common vertical line of tangency.

2. A bumper as set forth in claim 1, further including means securing said cylinders to each other along said line of tangency.

3. A bumper as set forth in claim 2, further including a plurality of vertically separated horizontally extending curved cradles, said cylinders resting within said cradles, said securing means also securing said cylinders to said cradles.

4. A bumper as set forth in claim 3, further including a vertical flat plate and additional means securing said cradles to said plate.

5. A bumper as set forth in claim 4, wherein said cylinders, said cradles and said plate, are all held together by said securing means.

References Cited in the file of this patent
UNITED STATES PATENTS

| | | |
|---|---|---|
| 1,152,320 | Jones | Aug. 31, 1915 |
| 1,439,209 | Watson | Dec. 19, 1922 |
| 1,457,259 | Malluk et al. | May 29, 1923 |
| 2,182,085 | Kellner et al. | Dec. 5, 1939 |
| 2,889,165 | Zientara | June 2, 1959 |
| 2,940,414 | Moore | June 14, 1960 |